July 5, 1938.  R. J. FOSTER  2,122,414
GAS SAVER FOR INTERNAL COMBUSTION ENGINES
Filed Oct. 10, 1935
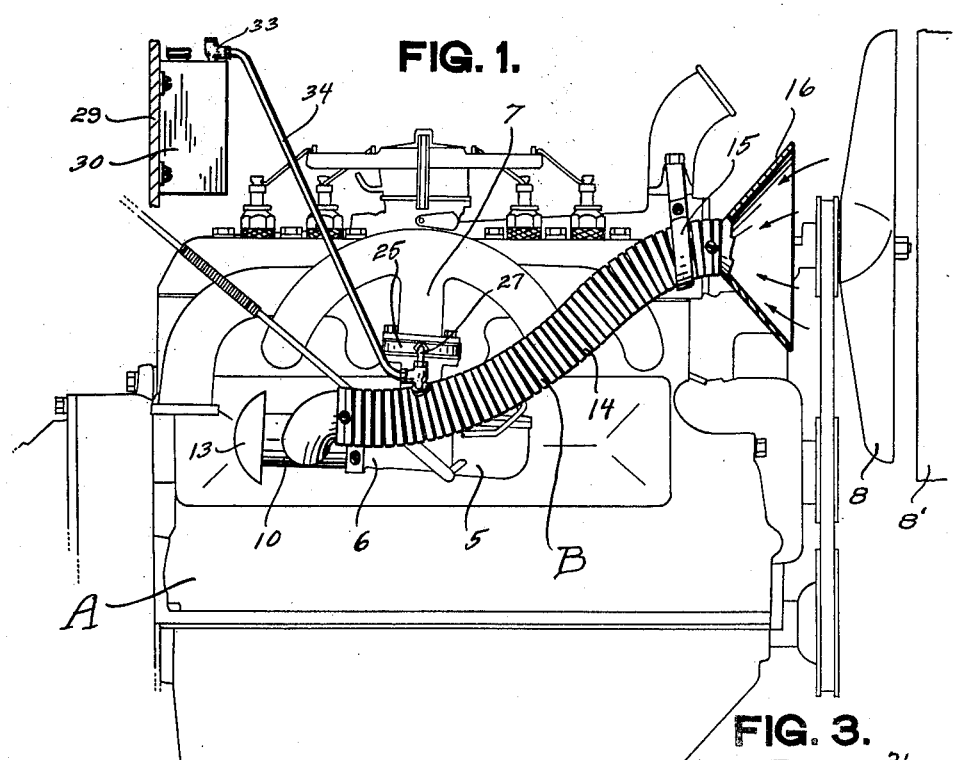
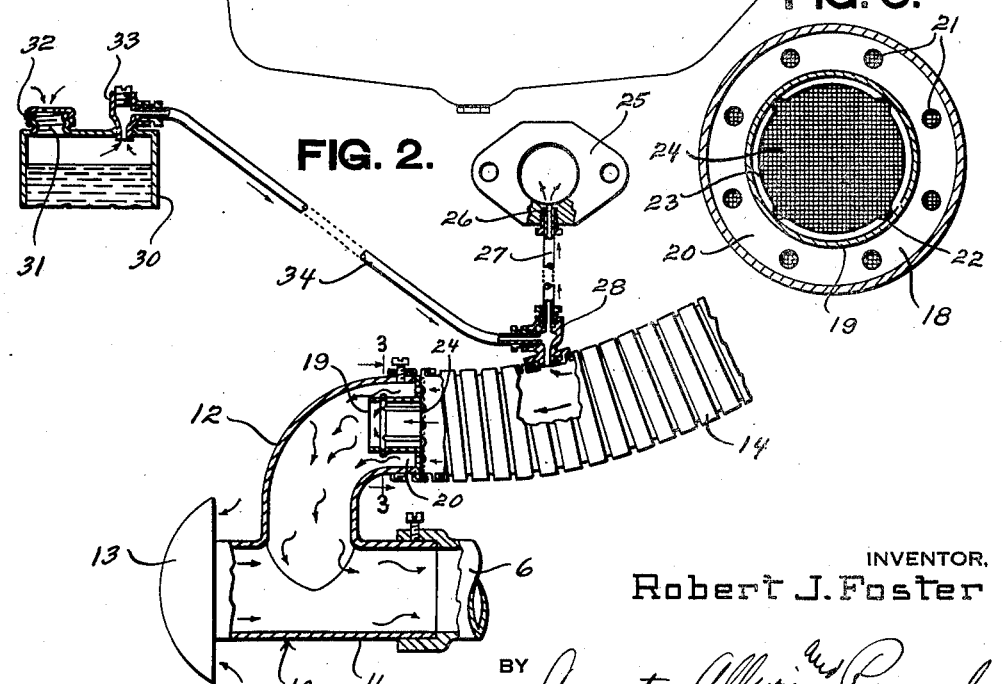
INVENTOR,
Robert J. Foster
BY Lancaster, Allwine and Rommel
ATTORNEYS.

Patented July 5, 1938

2,122,414

UNITED STATES PATENT OFFICE 2,122,414

GAS SAVER FOR INTERNAL COMBUSTION ENGINES

Robert J. Foster, Philadelphia, Pa., assignor of one-third to Samuel G. Lipford and one-third to Joseph C. V. Connelly, both of Philadelphia, Pa.

Application October 10, 1935, Serial No. 44,419

4 Claims. (Cl. 123—25)

The present invention relates to internal combustion engines, and more particularly to means associated with the carburetor for increasing the efficiency of the explosive charge delivered to the engine cylinders.

The primary object of the present invention is to provide a fuel saving attachment for internal combustion engines, embodying means for introducing a forced supply of fresh air into the air intake of the carburetor, and also an auxiliary supply of moist air into the intake pipe of the intake manifold for mixing with the fuel mixture.

A further object resides in the novel construction and arrangement of the air mixer for causing thorough mixing of the cold and warm air being delivered into the air intake for mixing with other air delivered from an air cleaner.

A further object is to provide apparatus of this character wherein the pressure of the forced air supply will be dependent upon the speed of the engine.

A still further object of the invention is to provide a device of this character which is of simple construction and may readily be applied to various types of internal combustion engines.

Other objects and advantages of the invention will be apparent from the following detailed description, taken in connection from the accompanying drawing, forming a part of this specification and in which drawing:—

Figure 1 is a view in side elevation of an internal combustion engine showing the device applied thereto.

Figure 2 is an enlarged fragmentary detail view somewhat diagrammatic and showing portions in section to better illustrate direction of air travel.

Figure 3 is an enlarged transverse section on line 3—3 of Figure 2.

Referring to the drawing in detail and wherein like reference characters designate corresponding parts thruout the several views, the letter A designates an internal combustion engine of the type such as used upon motor vehicles and B designates the gas saver attachment for increasing the efficiency of the fuel charge delivered to the engine.

The engine A in the example illustrated is of the type such as employed in connection with motor vehicles and embodies the carburetor 5 having the air intake 6, the carburetor being connected with the intake manifold 7 serving to deliver the explosive mixture to the cylinders of the engine. Arranged at the forward end of the engine is the cooling fan 8 which is driven by the engine and directs air rearwardly for cooling the engine. Arranged forwardly of the fan 8 is the usual radiator 8' thru which air is drawn by the fan.

Referring now to the device B, the same comprises an air coupling attachment 10 including a straight air tube portion 11 for attachment at one end to the air intake 6, and an elbow portion 12 opening at one end into the portion 11 intermediate the ends thereof. Mounted upon the outer end of the tube portion 11 is an air cleaner 13 thru which air may be drawn into the carburetor thru the intake 6. Connected at its rear lower end to the forwardly directed end of the elbow 12 is a preferably flexible, relatively large air conduit or pipe 14 which extends forwardly and upwardly to a position directly behind the fan 8. The forward end of the conduit 14 may be secured to the engine by a suitable clamp or bracket 15. Secured to the forward end of the conduit 14 is a forwardly opening funnel-shaped air collector 16 which is so arranged as to direct the blast of air from the fan 8 into the conduit 14 where it is conveyed to the air coupling attachment 10 for mixing with the air from the air cleaner 13 prior to passage into the air intake 6 of the carburetor. Thus it will be seen that during operation of the engine, the fan 8 will cause air to be forced thru the conduit 14 into the air intake of the carburetor, in addition to the air being drawn thru the air cleaner 13.

Some of the air forced into the funnel 16 will be cold while some of the air will be warm and it is desirable to cause a thorough mixing of this air before passage into the air intake 6. For so doing, an air mixer is arranged at the connection between the elbow 12 and the conduit 14. This air mixer comprises a disc 18 having an axial opening aligning with a tubular sleeve 19 projecting from the disc into the elbow 12 as clearly shown in Figure 2 and providing an annular air passageway, and the disc 18 is provided with a number of small air holes 21 arranged co-axially of the sleeve and opening to the annular air passageway 20. Formed on the inside of the sleeve 19 is a plurality of longitudinally extending grooves or channels 22 which extend from the disc 18 to a point adjacent the other end of the sleeve and terminate in an annular groove or channel 23 formed inwardly of the sleeve. A screen 24 is disposed over the face of the disc 18 for preventing dust from passing to the carburetor and this screen also acts to mix the air passing therethru. By observing the arrows shown in Figure 2 it will be seen that the air entering through the conduit 14 is in a state of violent agitation when contacting the air from the air cleaner 13 so as to thoroughly mix with this air before passing into the carburetor.

A means is also provided for introducing moist air into the intake manifold 7 for mixing with the fuel mixture and this means comprises a metal gasket 25 interposed between the coupling flanges of the carburetor 5 and the intake manifold 7 and secured by suitable bolts passed through the gasket and flanges. Opening radially into the circular passageway thru the gasket 25 is a moist air inlet 26 which communicates with an air tube 27. The opposite end of the air tube 27 is connected by means of a T coupling 28 with the upper side of the air conduit 14 at a point adjacent to the air mixer whereby a small quantity of air may pass to the intake manifold 7.

Mounted at any preferred location, and in the example shown upon the dash board 29, is a water container 30 having a filler opening 31 closed by a vented closure cap 32. Secured to and opening through the top wall of the water container 30, is a suitable coupling 33 to which is connected one end of a suction tube 34 having its opposite end connected to the coupling 28 whereby communication is had between the water container 30 and the tube 27.

Thus it will be seen that during operation of the engine A, suction created in the intake manifold 7 will cause air to be drawn through the air tube 27 from the conduit 14 into the intake manifold. This suction created in the air tube 27 will create a suction in the suction tube 34 whereby moist air in the upper portion of the water container 30 will be drawn into the stream of air being drawn through the tube 27 and pass along with this air into the intake manifold for mixing with the fuel mixture from the carburetor 5.

During operation of the engine A, the fan 8 will be rotated and cause air to be driven into the funnel-shaped air collector 16 and forced through the conduit 14 to the coupling attachment 10 where it mixes with and increases the supply of air being drawn through the air cleaner 13. At the same time, a suction is created in the air tube 27 and draws a small quantity of air from the air conduit 14. The suction in the tube 27 also creates a suction in the suction tube 34 for drawing moist air from the container 30 which is introduced into the intake manifold 7.

By having a forced supply of air delivered into the air intake of the carburetor, an increased fuel charge will be delivered to the engine cylinders, since the means 10, 14, 16, etc. will act as a supercharger unit. By introducing moist air into the fuel mixture, not only produces a better explosive charge, but also serves to eliminate formation of carbon in the engine cylinders.

From the foregoing it will be seen that a novel device for association with internal combustion engines has been provided which will materially increase the operating efficiency of the engine through the provision of means for producing a better explosive mixture for delivery to the engine cylinders.

Changes in detail may be made to the form of invention herein shown and described, without departing from the spirit of the invention or the scope of the claims.

I claim:

1. The combination with an internal combustion engine embodying a carburetor having an air intake, and an intake manifold; of means for introducing a forced supply of air into the air intake in addition to the normal passage of air therethru, and means for introducing moist air into the intake manifold by suction created in the intake manifold and having communication with said first mentioned means whereby air is drawn from the forced supply of air into the stream of moist air.

2. The combination with an internal combustion engine having a carburetor provided with an air intake, and an intake manifold; of an air conduit of relatively large capacity for delivering additional air into the air intake, an air tube of small capacity connecting the conduit and intake manifold, a water container, and a suction tube of small capacity connecting the container and said air tube.

3. A fuel saving attachment for internal combustion engines having a carburetor provided with an air intake, an intake manifold, and a cooling fan; comprising an air conduit connected at one end with and delivering additional air into the air intake, an air collector at the other end of the conduit for positioning in the air stream from the fan, an air tube connecting the conduit and intake manifold, a water container, and a suction tube connecting the upper end of the water container and the air tube.

4. In combination with a carburetor having an air intake, and an intake manifold; an air coupling connected with the air intake, an air cleaner for the air coupling and thru which air is drawn into the air intake, an air conduit connected with the air coupling and adapted to deliver a forced air supply to the coupling, an air mixer in the conduit, a small air tube connecting the conduit and intake manifold, and means communicating with the air tube for supplying moist air to the intake manifold thru suction created in the manifold.

ROBERT J. FOSTER.